US012661843B2

(12) United States Patent
Lanfant et al.

(10) Patent No.: US 12,661,843 B2
(45) Date of Patent: Jun. 23, 2026

(54) METHOD FOR MAKING A THIN-WALLED ACOUSTIC COMPONENT

(71) Applicant: SAFRAN, Paris (FR)

(72) Inventors: Pierre Nicolas Lanfant, Moissy-Cramayel (FR); Hugues Laurent Alglave, Moissy-Cramayel (FR); Patrick Dunleavy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 179 days.

(21) Appl. No.: 18/681,344

(22) PCT Filed: Aug. 3, 2022

(86) PCT No.: PCT/FR2022/051552
§ 371 (c)(1),
(2) Date: Feb. 5, 2024

(87) PCT Pub. No.: WO2023/017222
PCT Pub. Date: Feb. 16, 2023

(65) Prior Publication Data
US 2025/0144868 A1 May 8, 2025

(30) Foreign Application Priority Data
Aug. 9, 2021 (FR) ...................................... 2108589

(51) Int. Cl.
*B29C 51/00* (2006.01)
*B29C 51/26* (2006.01)
(Continued)

(52) U.S. Cl.
CPC .......... *B29C 51/006* (2013.01); *B29C 51/266* (2013.01); *B29C 51/428* (2013.01); *B29L 2022/00* (2013.01)

(58) Field of Classification Search
CPC ... B29C 51/428; B29C 51/266; B29C 51/082; B29C 51/10; B29C 51/006; B29C 51/02;
(Continued)

(56) References Cited

U.S. PATENT DOCUMENTS 4,039,609 A 8/1977 Thiel et al.
5,912,442 A 6/1999 Nye et al.
(Continued)

FOREIGN PATENT DOCUMENTS

DE 17 79 463 B1 3/1972
DE 11 2015 000089 T5 3/2016
(Continued)

OTHER PUBLICATIONS

International Search Report as issued in International Patent Application No. PCT/FR2022/051552, dated Jan. 5, 2023.

*Primary Examiner* — Monica A Huson
(74) *Attorney, Agent, or Firm* — CUSHMAN PARTNERS LLC

(57) ABSTRACT

A method for making an acoustic component includes a plurality of hollow complex acoustic elements, the method including heating a film of thermoplastic material to a first temperature above the glass transition temperature of the film; shaping the heated film of thermoplastic material in a tool including a mould which has a plurality of mould cavities having a shape corresponding to the shape of the complex acoustic elements of the acoustic component to be made, the heated film of thermoplastic material being shaped locally in each of the mould cavities, at least the mould being kept at a second temperature above the glass transition temperature of the thermoplastic material; cooling the mould; and removing a complex acoustic multi-element panel including a plurality of hollow complex acoustic elements from the mould.

8 Claims, 6 Drawing Sheets

(51) Int. Cl.
  *B29C 51/42* (2006.01)
  *B29L 22/00* (2006.01)

(58) Field of Classification Search
  CPC ............... G10K 11/172; B29L 2009/00; B29L
      2031/721; B29L 2031/60; B29L 2022/00
  See application file for complete search history.

(56) References Cited

U.S. PATENT DOCUMENTS

| | | | |
|---|---|---|---|
| 2003/0047565 A1 | 3/2003 | Oda et al. | |
| 2004/0198123 A1* | 10/2004 | Gillingham | ............... B32B 3/26 |
| | | | 428/137 |
| 2006/0090839 A1* | 5/2006 | O'Dowd | ............ B29C 66/8181 |
| | | | 156/196 |
| 2011/0108667 A1* | 5/2011 | Keller | ................... B29C 51/082 |
| | | | 244/119 |
| 2020/0265821 A1* | 8/2020 | Riccobene | ........... B29C 39/026 |

FOREIGN PATENT DOCUMENTS

| | | |
|---|---|---|
| EP | 0 738 865 A1 | 10/1996 |
| FR | 2 881 674 A1 | 8/2006 |
| FR | 3 082 987 A1 | 12/2019 |
| GB | 2 314 526 A | 1/1998 |

\* cited by examiner

[Fig. 1]
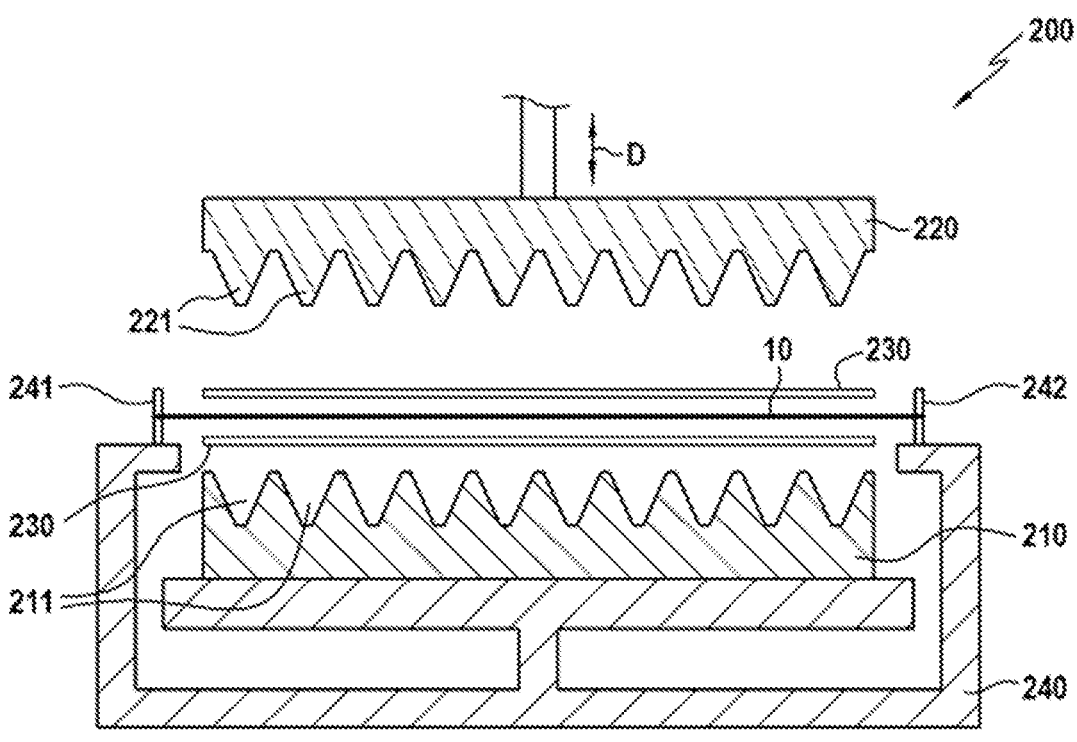
[Fig. 2]
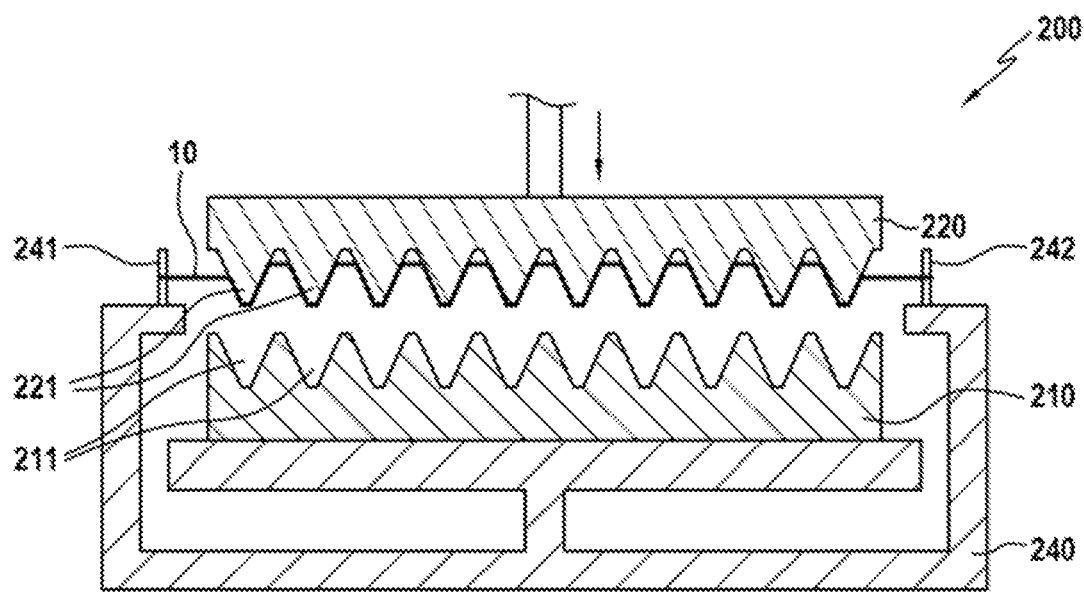

[Fig. 3]
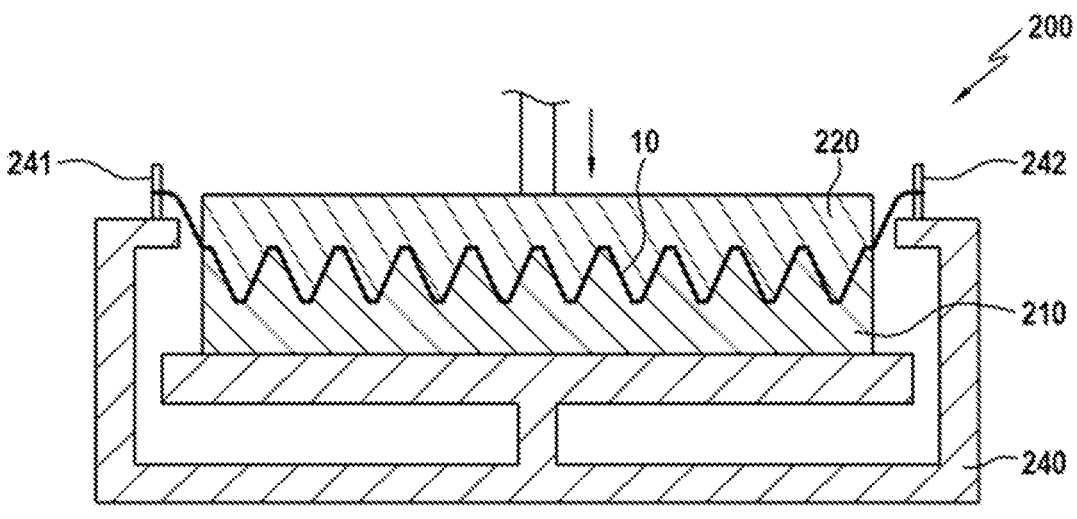
[Fig. 4]
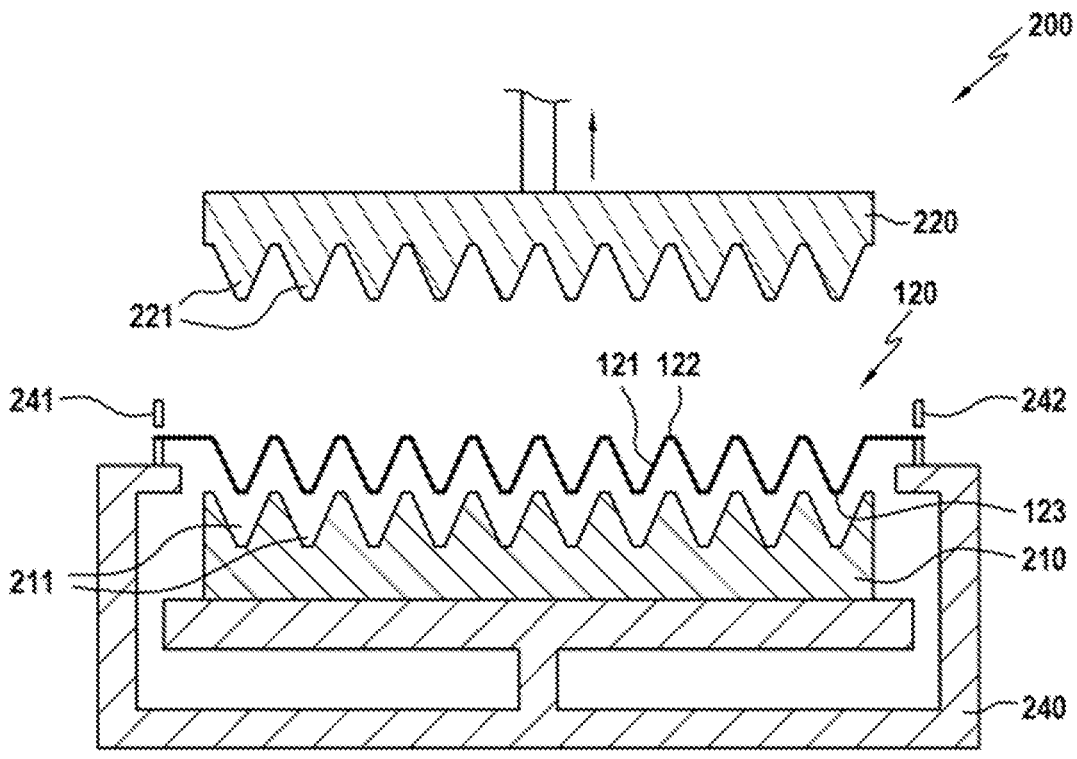

[Fig. 5]
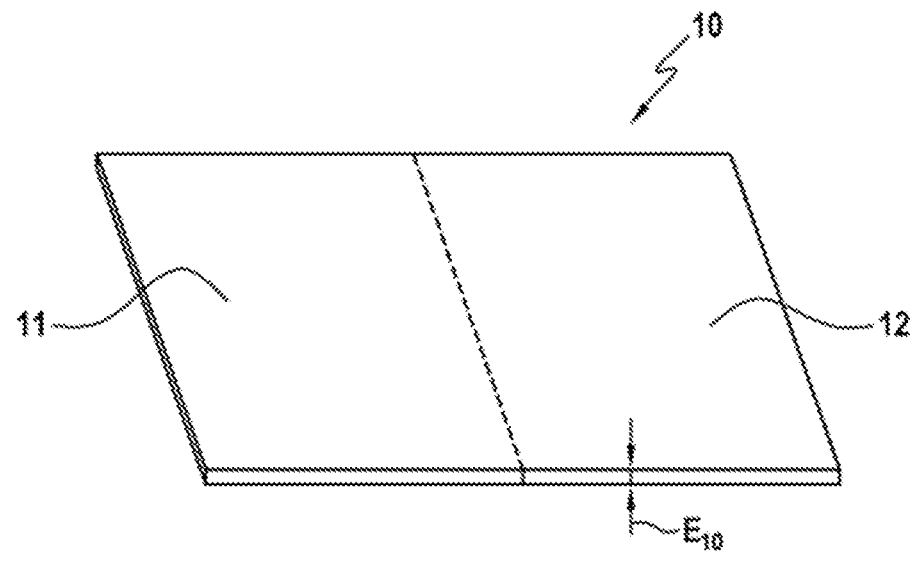
[Fig. 6]
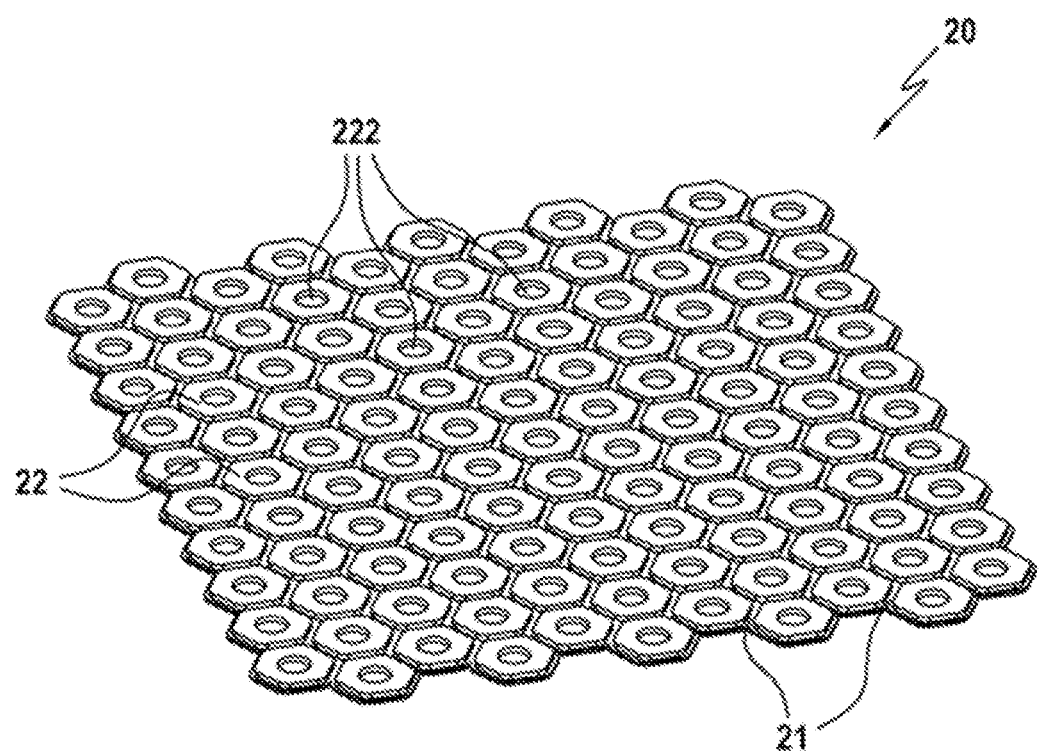

[Fig. 7]
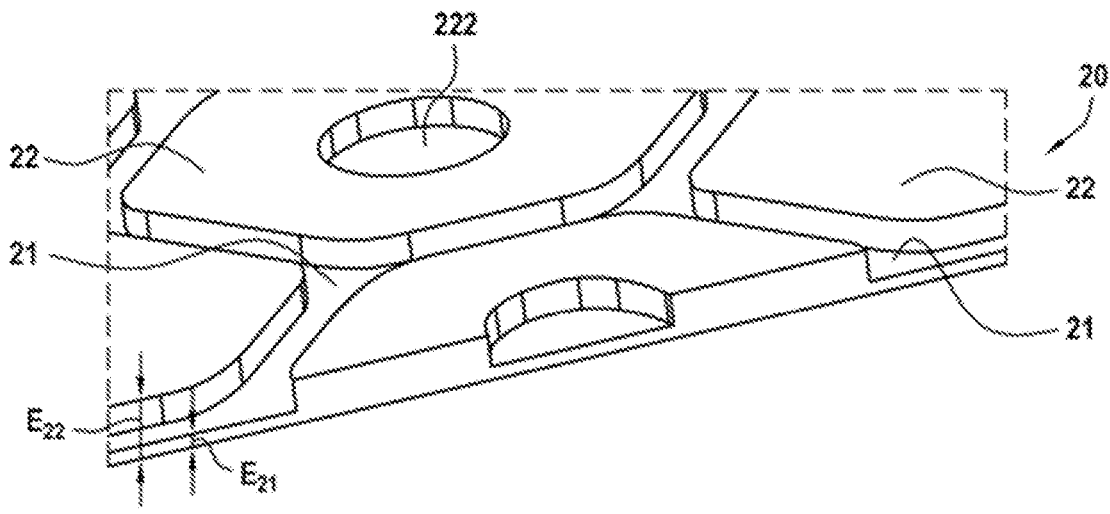

[Fig. 8]
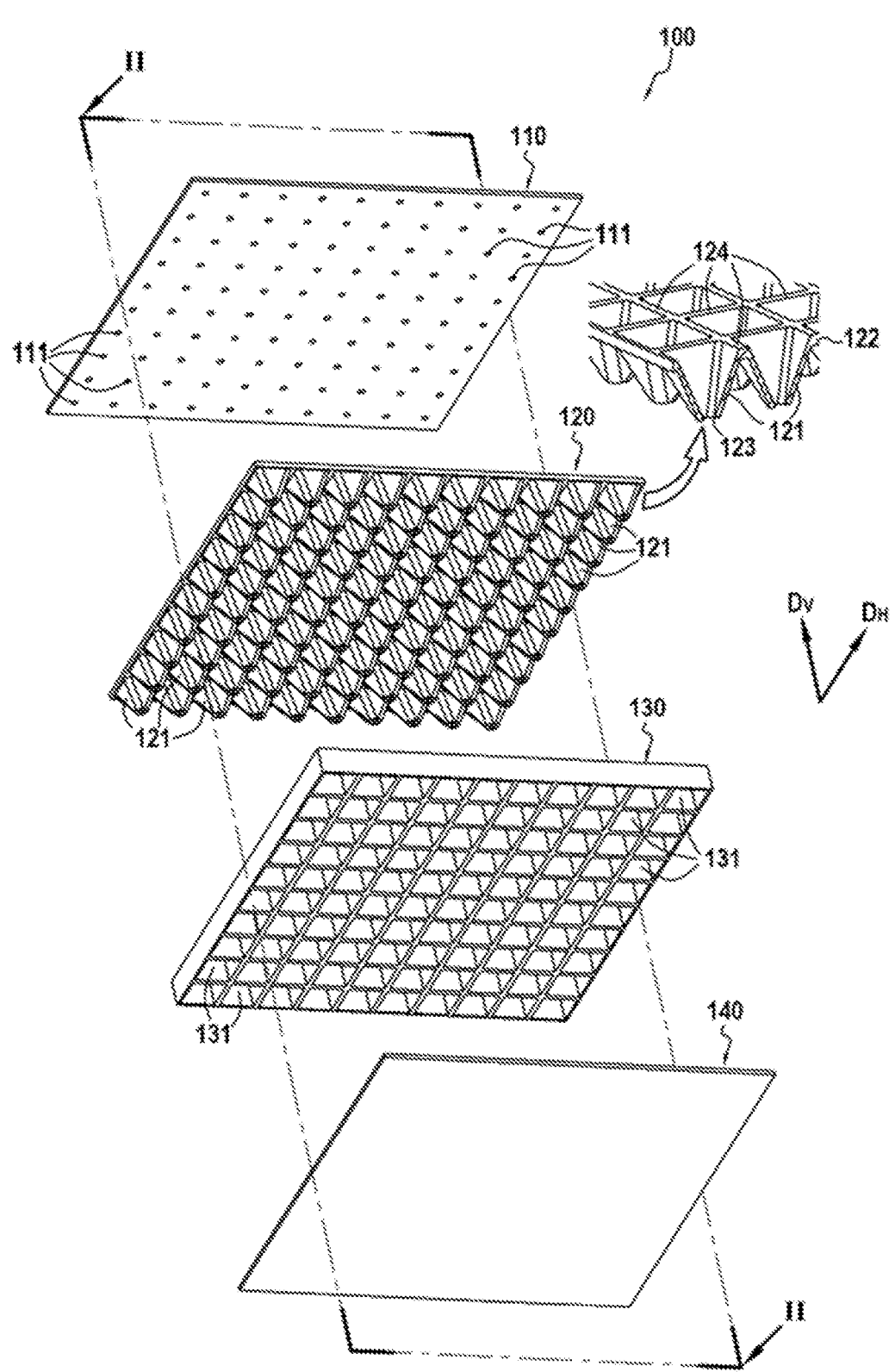

[Fig. 9]
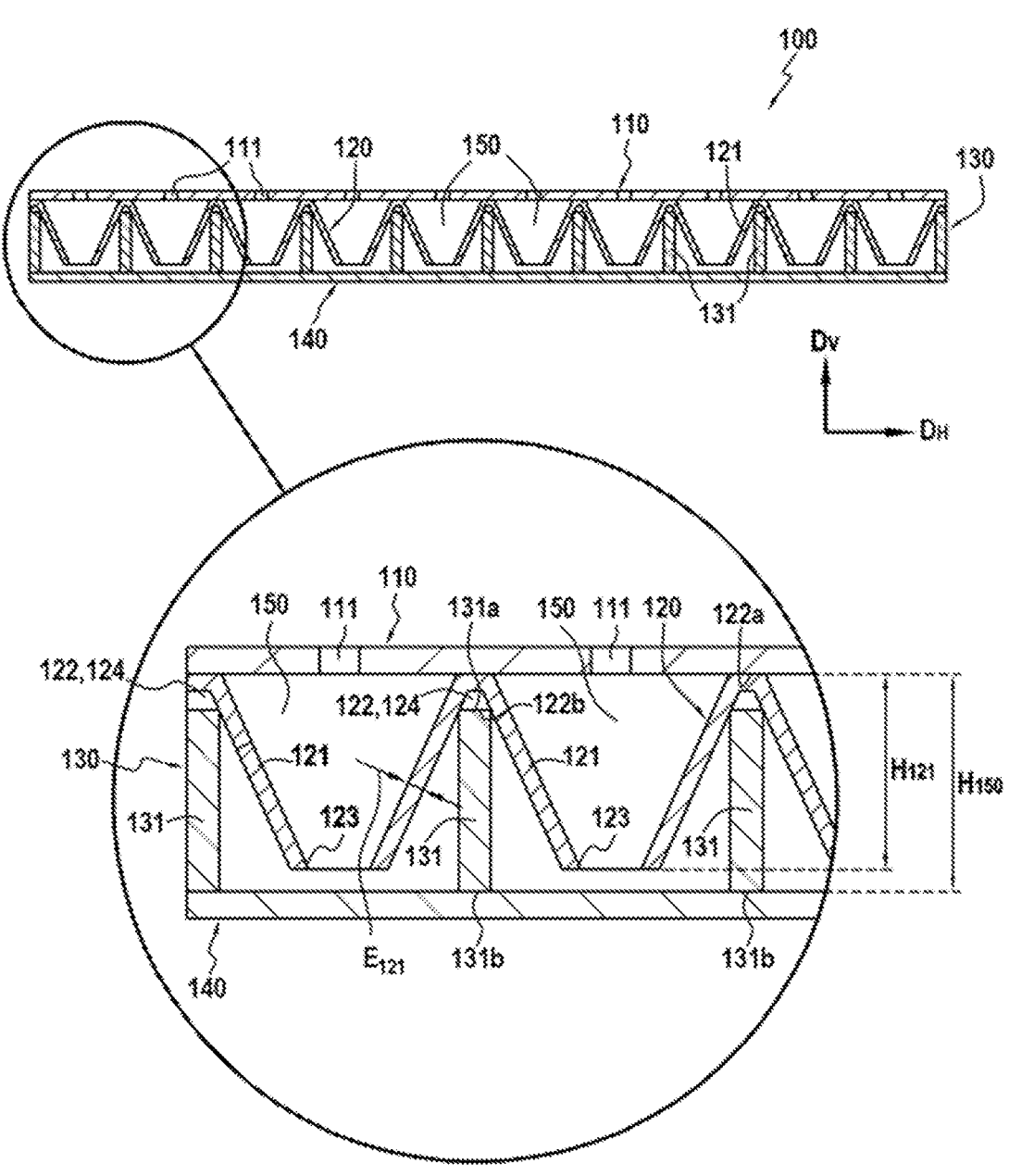

METHOD FOR MAKING A THIN-WALLED ACOUSTIC COMPONENT

CROSS-REFERENCE TO RELATED APPLICATIONS

This application is the U.S. National Stage of PCT/FR2022/051552, filed Aug. 3, 2022, which in turn claims priority to French patent application number 21 08589 filed Aug. 9, 2021. The content of these applications are incorporated herein by reference in their entireties.

TECHNICAL FIELD

The present invention relates to the general field of acoustic attenuation structures or panels. More particularly, it relates to acoustic attenuation structures used to reduce the noise produced by airplane engines such as gas turbines or exhausts thereof.

PRIOR ART

Acoustic attenuation structures typically consist of an acoustic surface plate or skin that is permeable to the acoustic waves that it is desired to attenuate, and a reflective solid plate or skin referred to as a "closure plate", a cellular body, such as a honeycomb or a porous structure, being disposed between these two walls. In a well-known manner, such panels form Helmholtz resonators which can attenuate acoustic waves in a certain frequency range. Acoustic attenuation structures of this type are described, in particular in documents U.S. Pat. No. 5,912,442 and GB 2 314 526.

These acoustic attenuation structures are limited to simple cell shapes such as those of the honeycomb cells of a conventional NIDAR structure. With this technology, the treated frequency is of the order of a quarter of the inverse of the cavity height. Very high cavities are therefore required in order to treat low frequencies which, in the case of propulsion systems, considerably increase their drag. In addition, the acoustic performances obtained are limited to the absorption of a very narrow range of frequencies.

A solution for increasing the acoustic attenuation frequency range is to superpose two cellular bodies having different cell shapes and dimensions. This solution has the disadvantage of significantly increasing the size and the drag of the acoustic attenuation structure.

Another known solution consists in placing open truncated cones in the cells, as described in documents EP 0 738 865 and FR 3 082 987. Although this solution enables the size of the acoustic attenuation structure to be reduced, the mass of the structure nevertheless remains significant and, consequently, penalising for uses in aircraft where control of the overall mass is always sought.

DISCLOSURE OF THE INVENTION

The main goal of the present invention is to provide a solution for acoustic attenuation structures which does not have the above-mentioned disadvantages.

In accordance with the invention, this goal is achieved by a method for making an acoustic component comprising a plurality of hollow complex acoustic elements each having a shape tapering gradually between a base and an apex, the hollow complex acoustic elements being connected to one another by one or more adjacent edges, the method comprising:

heating a film of thermoplastic material to a first temperature above the glass transition temperature or melting temperature of the thermoplastic material of said film, shaping the heated film of thermoplastic material in a tool comprising a mould which has a plurality of mould cavities having a shape corresponding to the shape of the hollow complex acoustic elements of the acoustic component to be made, the heated film of thermoplastic material being shaped locally in each of the mould cavities, at least the mould being kept at a second temperature above the glass transition temperature or melting temperature of the thermoplastic material and below the first temperature, cooling the mould to a third temperature below the glass transition temperature or melting temperature of the thermoplastic material, removing a complex acoustic multi-element panel comprising a plurality of hollow complex acoustic elements from the mould.

The method of the invention makes it possible to economically, reliably and repeatedly obtain acoustic components equipped with acoustic elements of complex shape, with a very low wall thickness, typically less than 1 mm. The acoustic component thus obtained enables the making of thinner, and therefore lighter, acoustic attenuation structures, while respecting the specifications required in terms of size, mechanical performance and mass.

Furthermore, during the shaping step, the mould is kept at a second temperature higher than the glass transition temperature or melting temperature of the thermoplastic material and lower than the first temperature. As explained in detail below, this makes it possible to form hollow complex acoustic elements with very low thickness walls.

According to a first particular aspect of the method of the invention, the film of thermoplastic material has a constant thickness.

According to a second particular aspect of the method of the invention, the film of thermoplastic material has a plurality of excess thickness portions at determined locations on the film, said locations corresponding to the locations of the mould cavities of the mould. The volume of material present in each excess thickness portion is defined as a function of the wall thickness of each complex acoustic element to be made.

According to a third particular aspect of the method of the invention, the mould cavities have a pyramid, conical, spiral, funnel or hopper shape.

According to a fourth particular aspect of the method of the invention, said method further comprises a step of making a film of thermoplastic material from granules of thermoplastic material.

According to a fifth particular aspect of the method of the invention, the film of thermoplastic material is obtained by stacking and/or welding several unit films joined together end-to-end.

According to a sixth particular aspect of the method of the invention, the complex acoustic elements of the acoustic component have a wall thickness less than 1 mm.

Another object of the invention is a method for making an acoustic attenuation structure, comprising the following steps:

producing an acoustic component according to the method for making an acoustic component of the invention, producing a complex acoustic multi-element panel comprising the acoustic component and a plurality of partitions forming acoustic cavities, each complex acoustic element of the acoustic component being housed in an acoustic cavity so as to form an acoustic cell, assembling a face of the complex acoustic multi-element panel with an assembly face of an acoustic skin.

The hollow complex acoustic elements of the acoustic component can advantageously be combined with partitions, which enables the acoustic frequencies to be treated to be lowered. It is thus possible to produce acoustic attenuation structures capable of attenuating sound waves at lower frequencies while having a reduced size.

According to a particular aspect of the method for making an acoustic attenuation structure, the acoustic attenuation structure further comprises a closure skin covering the horizontal face of the complex acoustic multi-element panel opposite the horizontal face covered by the acoustic skin, the method comprising the assembly of the part joining together the complex acoustic multi-element panel and the plurality of partitions with the closure skin.

Another object of the invention is a film of thermoplastic material for making an acoustic component comprising a plurality of hollow complex acoustic elements each having a shape tapering gradually between a base and an apex, the film of thermoplastic material having a plurality of excess thickness portions disposed at determined locations and spaced apart from one another by connection portions having a thickness less than the thickness of the excess thickness portions, the excess thickness portions each being intended to be stretched into or flow into mould cavities. The excess thickness portions are present at determined locations on the film, these locations corresponding to the locations of the mould cavities of the mould. The excess thickness portions constitute a surplus of material which, once stretched or flowed into the mould cavities during the shaping of the acoustic component, will make it possible to form hollow complex acoustic elements connected to one another by connection portions.

According to a particular aspect of the film of thermoplastic material, the surface and the thickness of each excess thickness portion is defined as a function of a projected surface and a thickness of each hollow complex acoustic element. It is thus possible to control the final thickness of the wall of the hollow complex acoustic elements, in particular so as to obtain a constant thickness over the entire acoustic component.

According to another particular aspect of the film of thermoplastic material, each excess thickness portion extends between the connection portions and an opening or cavity present at the centre of the excess thickness portion. The production of the hollow complex acoustic elements is facilitated in this way. The opening or cavity can form a hole, which makes it possible to directly form hollow complex acoustic elements with an opening at their apex, by stamping.

According to a particular aspect of the film of thermoplastic material, the excess thickness portions have a circular, annular or hexagonal shape.

BRIEF DESCRIPTION OF THE DRAWINGS

FIG. 1 is a schematic sectional view of a thermoforming tool showing a step of making an acoustic component according to an embodiment of the invention, FIG. 2 is a schematic sectional view of a thermoforming tool showing another step in the making of an acoustic component according to an embodiment of the invention, FIG. 3 is a schematic sectional view of a thermoforming tool showing another step in the making of an acoustic component according to an embodiment of the invention, FIG. 4 is a schematic sectional view of a thermoforming tool showing another step in the making of an acoustic component according to an embodiment of the invention, FIG. 5 is a schematic perspective view of a film of thermoplastic material used for making an acoustic component according to an embodiment of the invention, FIG. 6 is a schematic perspective view of a film of thermoplastic material used for making an acoustic component according to another embodiment of the invention, FIG. 7 is an enlarged detail view of a part of the film of thermoplastic material of FIG. 6, FIG. 8 is an exploded schematic view in perspective of an acoustic attenuation structure according to an embodiment of the invention, FIG. 9 is a schematic sectional view of the acoustic attenuation structure of the FIG. 1 once assembled.

DESCRIPTION OF THE EMBODIMENTS

FIGS. 1 to 4 illustrate a method for making an acoustic component according to an embodiment of the invention.

FIG. 1 illustrates a thermoforming tool 200 comprising a mould 210, a counter-mould 220 that can move in a double direction D, heating panels 230 and a frame 240 supporting the mould 210. The frame 240 is equipped with side clamps 241 and 242 in order to hold a film of thermoplastic material 10 during the steps of forming an acoustic component. The film of thermoplastic material can equally be deposited on the tool by an automated machine or manually. It can also be delivered by a conveying system.

The mould 210 comprises mould cavities 211 intended to interact with teeth 221 in order to form the acoustic component from the film of thermoplastic material 10. The mould cavities 211 of the mould 210 have a shape corresponding to the shape of the hollow complex acoustic elements of the acoustic component to be made.

The method starts with heating, by the heating panels 230, of the film of thermoplastic material 10 to a first temperature above the glass transition temperature or melting temperature of the thermoplastic material of the film, as illustrated in FIG. 1. More precisely, in the case of an amorphous thermoplastic material, the film is heated to a temperature above the glass transition temperature of the material while, in the case of a semi-crystalline thermoplastic material, the film is heated to a temperature above the melting temperature of the material.

According to an alternative embodiment, the film of thermoplastic material can be heated to the first temperature above the glass transition temperature or melting temperature of the thermoplastic material of the film before being placed above the mould, for example by heating the side of the film in an infrared oven.

The film is heated to the first temperature, preferably after its placing above the mould, because this enables better positioning of the film in the thermoforming tool.

Once this first temperature is attained by the film, the shaping of the film of thermoplastic material 10 takes place. To this effect, the counter-mould 220 is moved towards the mould 210 as illustrated in FIG. 2 and until the teeth 221 of the counter-mould 220 interact completely with the mould cavities 211 as represented in FIG. 3. The heated film of thermoplastic material is shaped locally in each of the mould cavities 211. During this shaping step, the mould 210 and, optionally the counter-mould 220, are preferably held at a second temperature above the glass transition temperature or melting temperature of the thermoplastic material and below the first temperature.

This makes it possible to form hollow complex acoustic elements with very low thickness walls. More precisely, by keeping the thermoforming tool at a temperature above the glass transition temperature or melting temperature of the thermoplastic material, the flow of material is facilitated during the shaping of the film by stamping. This avoids tearing the film of thermoplastic material which initially has an already relatively low thickness, for example of order 1 mm to 2 mm.

Once the film of plastic material 10 is completely deformed in the cavities 210, as illustrated in FIG. 3, the mould 210 and, optionally the counter-mould 220, are cooled to a third temperature below the glass transition temperature or melting temperature of the thermoplastic material, enabling said material to set in the shape of an acoustic component 120 to be made. Once the temperature of the thermoforming tool is at least 10° C. lower than the glass transition temperature or melting temperature of the thermoplastic material, the acoustic component formed can be removed from the mould.

The acoustic component 120 is then removed from the mould by moving the counter-mould 220 in the direction away from the mould 210 and by opening the side clamps in order to release the acoustic component.

An acoustic component 120 is then obtained, as illustrated in FIGS. 8 and 9, comprising a plurality of hollow complex acoustic elements 121 each having a shape tapering gradually between a base 122 and an apex 123, and having a wall thickness $E_{121}$ less than 1 mm (FIG. 9). The shape of the mould cavities of the mould defines the shape of the hollow complex acoustic elements of the acoustic component. In the example described here, the mould cavities 211 have a pyramid shape enabling hollow complex acoustic elements 121 of the same shape to be formed. The mould cavities and, consequently, the resulting hollow complex acoustic elements can have other shapes such as a conical, spiral, funnel or hopper shape.

In the example described above, the acoustic component is shaped by thermoforming between a mould and a counter-mould. This thermoforming method corresponds to the technique of stamping or embossing by a male and female mould, also called "positive and negative" moulds.

However, the shaping of the acoustic component from a heated film of thermoplastic material can be obtained by other methods such as, in particular:

vacuum forming; a method in which a vacuum, created between the material and the mould, forces the material to match the shape of the mould under the effect of atmospheric pressure (approximately 1 bar);

pressurised thermoforming or blow moulding; a method in which the shaping is ensured by a pressure driving out the air between the material and the mould.

In general, any method enabling a film of thermoplastic material to be heated and placed on a mould in the shape of the acoustic component to be made, can be used.

In addition, in accordance with the invention and whatever the tool used, this must comprise means for controlling at least the temperature of the mould in order to keep it at the second temperature described above, during the shaping of the film of thermoplastic material. To this effect, the tool can comprise temperature regulating means using, for example, induction or pulsed air, the temperature regulation being controllable by area in the tool. The tool and, in particular, the mould is preferably produced from a metal having a high heat transfer capacity, such as aluminium for example.

The thermoplastic material of the film used for making the acoustic component can be, in particular but not exclusively, selected from the following materials: polyaryletherketones (PAEK) such as polyetheretherketone (PEEK) and polyetherketoneketone (PEKK), polyetherimides (PEI), polycarbonate (PC), polyphenylene sulfide (PPS) and polysulfones (PSU). The thermoplastic material may or may not include a filler.

The acoustic component made according to the method of the invention can have a flat shape, such as the acoustic component 120 illustrated in FIGS. 8 and 9 or a curved shape having a single or multiple curves. In this latter case, the curve or curves can be produced directly during the shaping of the film with a mould having a suitable geometry or after the shaping step by conformation or hot forming. Regarding the conformation or hot forming of the acoustic component after shaping, this operation can be carried out by placing the component flat on a tool having the curve or curves, the tool comprising heating means for heating the component to a temperature above the glass transition temperature of the thermoplastic material and means for applying a uniform force on the component.

The film of thermoplastic material used to make the acoustic component can have a constant thickness like film 10 illustrated in FIG. 5. The film can be produced in a single piece or obtained by welding a plurality of unit films joined together end-to-end like the unit films 11 and 12 in FIG. 5 which, once welded, form a film of thermoplastic material 10 of constant thickness $E_{10}$. The film of thermoplastic material can be manufactured from granules of thermoplastic material by injection or any other method suitable for the formation of a film.

The film of thermoplastic material used to make the acoustic component can also have a variable thickness, like the film 20 illustrated in FIGS. 6 and 7. More precisely, the film of thermoplastic material 20 has a plurality of excess thickness portions 22 having a thickness $E_{22}$ greater than the thickness $E_{21}$ of the connection portions 21 of the film 20 present between the excess thickness portions 22 (FIG. 7). The excess thickness portions are present at determined locations on the film, these locations corresponding to the locations of the mould cavities of the mould. The excess thickness portions 22 constitute a surplus of material which, once stretched or flowed into the mould cavities during the shaping of the acoustic component, will make it possible to form hollow complex acoustic elements with a wall thickness close to that of the connection portions 21. The volume of material present in each excess thickness portion is defined as a function of the wall thickness of each complex acoustic element to be made. The excess thickness portions can have a circular, annular or hexagonal shape and be uniformly distributed over the film. In the example described here, each excess thickness portion 22 extends between connection portions 21 and an opening or cavity 222 present at the centre of the excess thickness portion. Each opening or cavity 222 is intended to be aligned with the centre of the mould cavities of the mould. According to a particular feature, the opening or central cavity 222 forms a hole. This makes it possible to obtain the outlet orifice of each complex acoustic element, immediately after the shaping. An additional machining operation is thus avoided. The diameter of the opening or cavity 222 is preferably greater than the diameter of the end of the teeth 221 of the counter-mould 220. By way of a non-limiting example, in the case where the diameter of the end of the teeth of the counter-mould is 5 mm, the hole formed by the central opening has a diameter between 6 mm and 7 mm.

Each excess thickness portion is intended to form, by stretching or flowing, a hollow complex acoustic element 121 having a shape tapering gradually between its base 122 and its apex 123. It changes therefore from an initial flat surface Spl corresponding to the excess thickness portion which extends between the connection portions 21 and the central cavity opening 222, to a larger projected surface Spr corresponding to the surface of the hollow complex acoustic element 121. The ratio between the initial flat surface Spl and the projected surface Spr defines a slenderness factor Fe which can be between 2 and 5. The principle is that of conservation of mass. Thus the initial flat surface Spl and the initial thickness $E_{22}$ of each excess thickness portion 22 is defined as a function of the projected surface Spr and of the final thicknesses $E_{121}$ of each hollow complex acoustic element 121 according to the following formula:

$$Spl \times E_{22} = Spr \times E_{121}$$

In the case where it is desired to produce an acoustic component of constant thickness Ec, the thickness $E_{22}$ of the excess thickness 22 can be determined according to the following formula:

$$E_{22} = (Spr/Spl) \times Ec = Fe \times Ec$$

In this case, the thickness $E_{21}$ of the connection portions 21 which are not intended to be stretched or flowed, substantially corresponds to the final thickness of the acoustic component 120.

By way of non-limiting example, the thickness $E_{21}$ of the connection portions 21 can be, for example, 0.5 mm while the thickness $E_{22}$ of the excess thickness portions 22 can be 1.6 mm.

Such a film of thermoplastic material of variable thickness can be made by calendering, machining, stacking of unit wires, injection moulding, etc.

Below, a method is described, with reference to FIGS. 8 and 9, for making an acoustic attenuation structure in accordance with an embodiment of the invention. In this case, the acoustic attenuation structure 100 comprises an acoustic skin or plate 110, an acoustic component 120 made as described above, a plurality of partitions 131 and a closure skin or plate 140.

The closure skin 140 corresponds to a solid surface intended to reflect sound waves entering the acoustic attenuation structure. The closure skin can be a constituent element of the acoustic attenuation structure, as in the example described here, or correspond to a structure of an object, for example an aircraft engine. In this latter case, the acoustic attenuation structure of the invention does not comprise a closure skin and is mounted directly on the structure of the object.

The acoustic skin 110 has the function of allowing the sound waves to be attenuated to pass into the interior of the acoustic attenuation structure 100. For this purpose and in the example described here, the acoustic skin 110 comprises a plurality of perforations 111.

The acoustic component 120 is formed in a single piece and extends in length and in width along a horizontal direction DH and in height along a vertical direction Dv. The acoustic component comprises a plurality of hollow complex acoustic elements 121 each having a shape tapering gradually between a base 122 and an apex 123.

In the example described here, the complex acoustic elements 121 have a pyramid shape. The base 122 of each complex acoustic element 121 is in continuous contact with the base of the adjacent complex acoustic elements, so as to form a continuous network of edges 124.

In the exemplary embodiment described here, the plurality of partitions 131 is produced in a single piece, namely a network of ribs 130 which, once assembled with the complex acoustic multi-element panel 120, form the partitions around the complex acoustic elements 121.

Still in the example described here, the acoustic attenuation structure 100 is produced by assembling the complex acoustic multi-element panel 120 with the plurality of partitions 131 in a single piece, the upper edge 131a of the partitions 131 being fixed, for example by bonding or welding, on the lower portion 122b of the bases 122 of the complex acoustic elements 121 (FIG. 9). The plurality of complex acoustic elements being formed in a single piece within the complex acoustic multi-element panel and the plurality of partitions being itself also formed in a single piece, the assembling of the two elements is largely facilitated by the auto-positioning of the complex acoustic elements with the partitions.

The closure skin 140 is fixed, for example by bonding or welding, on the lower edge 131b of the partitions 131, while the acoustic skin 110 is fixed, by bonding or welding, on the upper portion 122a of the bases 122 of the complex acoustic elements 121 corresponding to the exposed surface of the edges 124. Hence, the acoustic skin and the closure skin are each fixed on a perfectly flat support following the horizontal direction DH, which makes it possible to ensure very good sealing between the skins and the assembly of the complex acoustic multi-element panel with the plurality of partitions.

Once assembled, the attenuation structure 100 comprises a plurality of acoustic cells 150, each formed by a complex acoustic element 121 and the partitions 131 which surround it (FIG. 9). The height $H_{121}$ of the complex acoustic elements 121 is less than the height $H_{150}$ of the acoustic cells 150. More precisely, the height $H_{121}$ of the acoustic cells is between 10% and 99% of the height $H_{150}$ of the acoustic cells in the vertical direction. The height $H_{121}$ can be between 5 mm and 100 mm, while the base of each element 121 can be inscribed in a circle of diameter between 5 mm and 50 mm. In addition, through the manufacturing method of the invention, the hollow complex acoustic elements 121 have a very low thickness $E_{121}$, less than 1 mm and typically between 0.2 mm and 0.5 mm.

The acoustic skin, the plurality of partitions and the closure skin can be produced by injection of a thermoplastic or thermosetting material, with or without filler, by injection-compression of a thermoplastic or thermosetting material, with or without filler, or by injection with temperature control of the tool of a thermoplastic or thermosetting material, with or without filler.

The plurality of partitions, the acoustic and closure skins, as well as the assemblies joining together in a single piece the plurality of partitions and the complex acoustic multi-element panel or the plurality of partitions and skins, can also be produced by injection of a thermoplastic or thermosetting material, with or without filler.

The invention claimed is:

1. A method for making an acoustic component comprising a plurality of hollow complex acoustic elements each having a shape tapering gradually between a base and an apex, the hollow complex acoustic elements being connected to one another by one or more adjacent edges, the method comprising:

heating a film of thermoplastic material to a first temperature above a glass transition temperature or melting temperature of said film, shaping the heated film of thermoplastic material in a tool comprising a mould which has a plurality of mould cavities having a shape corresponding to the shape of the hollow complex acoustic elements of the acoustic component to be made, the heated film of thermoplastic material being shaped locally in each of the mould cavities, at least the mould being kept at a second temperature above the glass transition temperature or melting temperature of the thermoplastic material and below the first temperature, cooling the mould to a third temperature below the glass transition temperature or melting temperature of the thermoplastic material, and removing a complex acoustic multi-element panel comprising said plurality of hollow complex acoustic elements from the mould, wherein the film of thermoplastic material has a plurality of portions of excess thickness at determined locations on the film, said locations corresponding to the locations of the mould cavities of the mould.

2. The method according to claim 1, wherein a volume of material present in each excess thickness portion is defined as a function of the wall thickness of each complex acoustic element to be made.

3. The method according to claim 1, wherein the mould cavities have a pyramid, conical, spiral, funnel or hopper shape.

4. The method according to claim 1, further comprising making a film of thermoplastic material from granules of thermoplastic material.

5. The method according to claim 1, wherein the film of thermoplastic material is obtained by welding several unit films joined together end-to-end.

6. The method according to claim 1, wherein the complex acoustic elements of the acoustic component have a wall thickness less than 1 mm.

7. A method for making an acoustic attenuation structure comprising:

producing an acoustic component according to the method as defined in claim 1, producing a complex acoustic multi-element panel comprising the acoustic component and a plurality of partitions forming acoustic cavities, each complex acoustic element of the acoustic component being housed in an acoustic cavity so as to form an acoustic cell, and assembling a face of the complex acoustic multi-element panel with an assembly face of an acoustic skin.

8. The method according to claim 7, wherein the acoustic attenuation structure further comprises a closure skin covering the horizontal face of the complex acoustic multi-element panel opposite the horizontal face covered by the acoustic skin, the method comprising assembling the part joining together the complex acoustic multi-element panel and the plurality of partitions with the closure skin.

* * * * *